US006996608B2

(12) United States Patent  
Smith et al.

(10) Patent No.: US 6,996,608 B2
(45) Date of Patent: Feb. 7, 2006

(54) METHOD FOR FACILITATING THE ENTRY OF A URL ADDRESS INTO AN INTERNET WEB BROWSER URL ADDRESS WINDOW

(75) Inventors: Anthony Smith, Oxford (GB); Boris Nalibotski, New London, CT (US); Raanan Liebermann, North Haven, CT (US)

(73) Assignee: Signtel, Inc., North Haven, CT (US)

( * ) Notice: Subject to any disclaimer, the term of this patent is extended or adjusted under 35 U.S.C. 154(b) by 793 days.

(21) Appl. No.: 09/814,507

(22) Filed: Mar. 22, 2001

(65) Prior Publication Data

US 2002/0138626 A1 Sep. 26, 2002

(51) Int. Cl.
 *G06F 15/16* (2006.01)
 *G06F 3/00* (2006.01)
(52) U.S. Cl. .................. 709/217; 715/711; 715/729
(58) Field of Classification Search ............... 345/760, 345/764, 780, 808, 809; 715/711, 729, 738, 715/739, 744, 763, 779, 780; 709/203, 217, 709/227
See application file for complete search history.

(56) References Cited

U.S. PATENT DOCUMENTS

| 5,604,858 | A | * | 2/1997 | Jefferson et al. | ............ | 345/788 |
| 5,950,190 | A | * | 9/1999 | Yeager et al. | .................. | 707/3 |
| 6,072,486 | A | * | 6/2000 | Sheldon et al. | ............. | 345/835 |
| 6,518,987 | B1 | * | 2/2003 | Crevasse et al. | ............ | 345/810 |
| 6,665,642 | B2 | * | 12/2003 | Kanevsky et al. | .......... | 704/260 |
| 2001/0044855 | A1 | * | 11/2001 | Vermeire et al. | ........... | 709/310 |
| 2002/0143627 | A1 | * | 10/2002 | Barsade et al. | ............... | 705/14 |

FOREIGN PATENT DOCUMENTS

| JP | 07225768 A | * | 8/1995 |
| JP | 10091382 A | * | 4/1998 |
| JP | 11024646 A | * | 1/1999 |

OTHER PUBLICATIONS

W3C Working Draft, "WAI Accessibility Guidelines: Browser User Interface", Jun. 2, 1998, retrieved on Aug. 6, 2004 form <http://www.w3.org/WAI/UA/wd-wai-ua-browser-19980602.html>.*
Gunderson, Jon., "World Wide Web Browser Guidelines", Feb. 13, 1997, retrieved on Aug. 6, 2004 from <http://www.w3.org/WAI/UA/wai-browser-gl>.*
Bennefield, Robin, "Catching a view of the Web (Making the World Wide Web accessible to the disabled", May 19, 1997, U.S. News & World Report, V122, n19, p68 (2).*

* cited by examiner

*Primary Examiner*—Marc D. Thompson
*Assistant Examiner*—Yemane M. Gerezgiher
(74) *Attorney, Agent, or Firm*—Bachman & LaPointe, P.C.

(57) ABSTRACT

A method for entering and facilitating the input of an Internet Uniform Resource Locator (URL) address into a URL address window including the steps of providing an interactive device for connecting to the Internet via a web browser having a URL address window, where the interactive device includes an operating system which employs a cursor and a cursor device for communicating position commands to the operating system, connecting to the Internet using the interactive device and the web browser, positioning the cursor over the URL address window, receiving a cursor position command, validating the cursor position command, displaying an enlarged text window, entering a desired URL address into the enlarged text window, inserting the entered URL address into the URL address window and engaging the interactive device so as to cause the web browser to be communicated with the URL address.

7 Claims, 3 Drawing Sheets

METHOD FOR FACILITATING THE ENTRY OF A URL ADDRESS INTO AN INTERNET WEB BROWSER URL ADDRESS WINDOW

BACKGROUND OF THE INVENTION

The present invention is directed towards facilitating the entry of an Internet Uniform Resource Locator (URL) address into an Internet web browser URL address window and has particular utility in assisting individuals who are sight impaired with negotiating web pages on the Internet or on an intranet.

In order for an Internet web browser to be communicated with a specific Internet web address, a user has to communicate the desired Internet web address, or URL, to the web browser. A common way to do this is by the user entering the specific URL into the URL address window of the user's web browser. Unfortunately, because of the limited computer screen space and large amount of information that needs to be displayed to a user, conventional URL address windows are kept relatively small. For this reason, individuals who are sight impaired have difficulty seeing URL addresses that they are entering into a URL web address window.

Consequently, the need remains for a method of assisting sight impaired individuals in entering URL addresses into existing Internet web browser URL address windows.

SUMMARY OF THE INVENTION

In accordance with the present invention, the following objects and advantages are readily attained.

According to the present invention, a method for entering an Internet Uniform Resource Locator (URL) address into a URL address window is provided which comprises the steps of providing an interactive means for connecting to the Internet via a web browser having a URL address window, wherein the interactive means has an operating system which employs a software and or hardware controlled cursor, connecting to the Internet using the interactive means and the web browser, positioning the cursor over the URL address window, displaying an enlarged edit window to the user, retrieving a URL address from the web browser and inputting the URL address into the edit window, entering or editing a URL address into the enlarged text window and engaging the interactive means so as to cause the web browser to be communicated with the desired URL address. The enlarged window, when it appears, displays the current URL address to which the web browser is connected, thus allowing the user to observe and correct it.

Also, according to the present invention, a method for facilitating the input of an Internet Uniform Resource Locater (URL) address into a URL address window is provided which comprises the steps of providing an interactive means for connecting to the Internet via a web browser having a URL address window, wherein the interactive means has an operating system which employs a software and or hardware controlled cursor and a cursor means for communicating a cursor position command to the operating system, receiving a cursor position command, validating the received cursor position command, displaying an enlarged text window to a user upon a determination of a valid cursor position command to allow the user to observe and correct the URL address if needed, entering a desired URL address into the text window and inserting the desired URL address into the URL address window. The desired URL address may be an edited URL address or a new URL address.

It is an objective of the present invention to provide a method for facilitating the entry of an Internet URL address into the URL address window of an Internet web browser.

It is a further objective of the present invention to provide a method for entering an Internet URL address into the URL address window of an Internet web browser.

Other objects and advantages will appear hereinbelow.

BRIEF DESCRIPTION OF THE DRAWINGS

A detailed description of preferred embodiments of the present invention follows, with reference to the attached drawings, wherein like numerals depict like elements.

DETAILED DESCRIPTION OF PREFERRED EMBODIMENT(S)

used herein, the term 'URL' refers to a Uniform Resource Locator and may be used interchangeably with 'web address'.

As used herein, the term 'text window' may be used interchangeably with edit 'window'.

As used herein, the term 'computer' refers to any conventional apparatus for communicating a user to the Internet.

As used herein, the term 'mouse' refers to any device used to control and/or position a cursor on a computer screen.

As used herein, the term 'web browser' refers to Microsoft Internet Explorer or any equivalent web browser.

Figure 1:
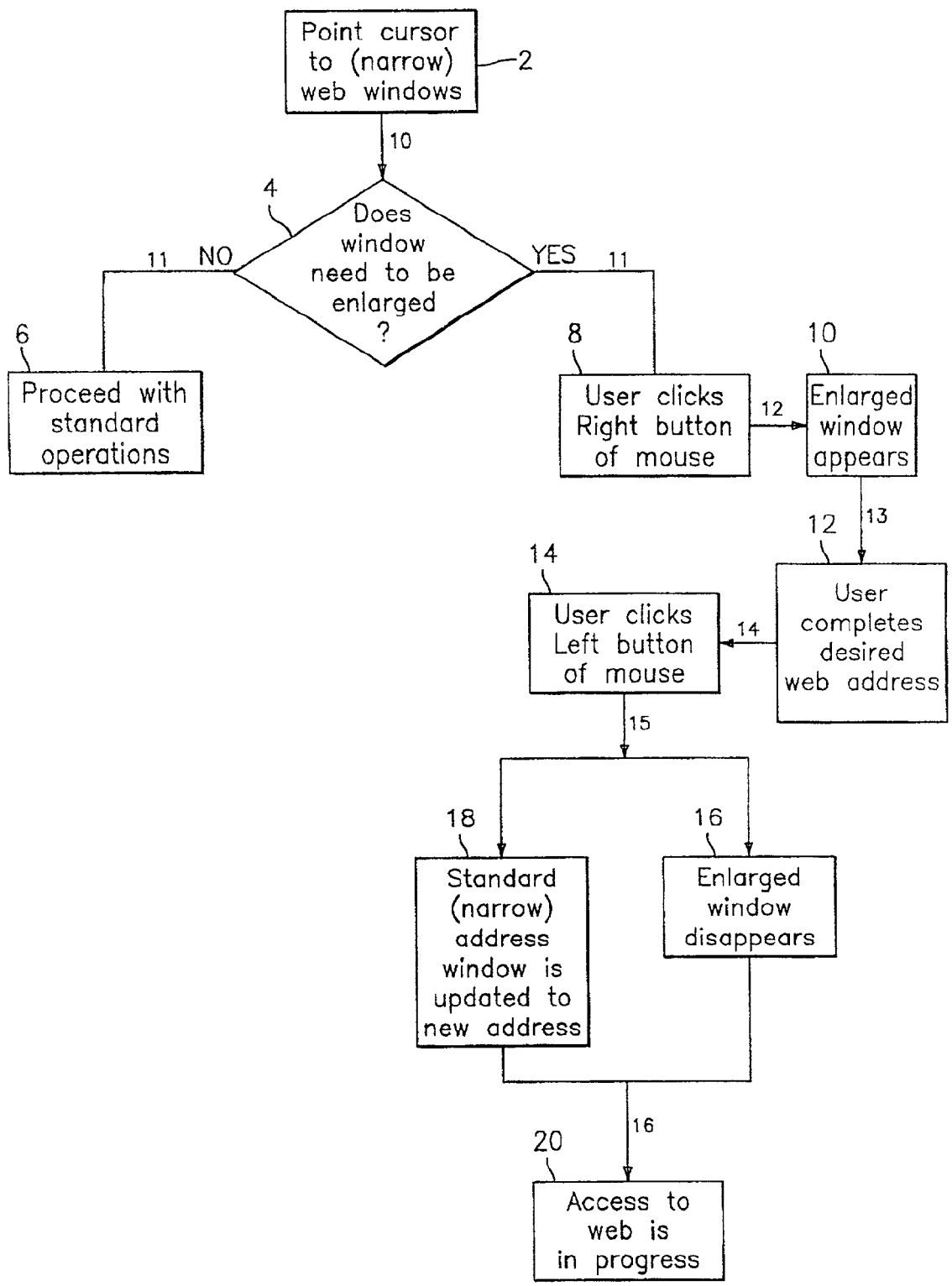
FIG. 1 is a flow chart which illustrates an overall system layout of the present invention.
Figure 2:
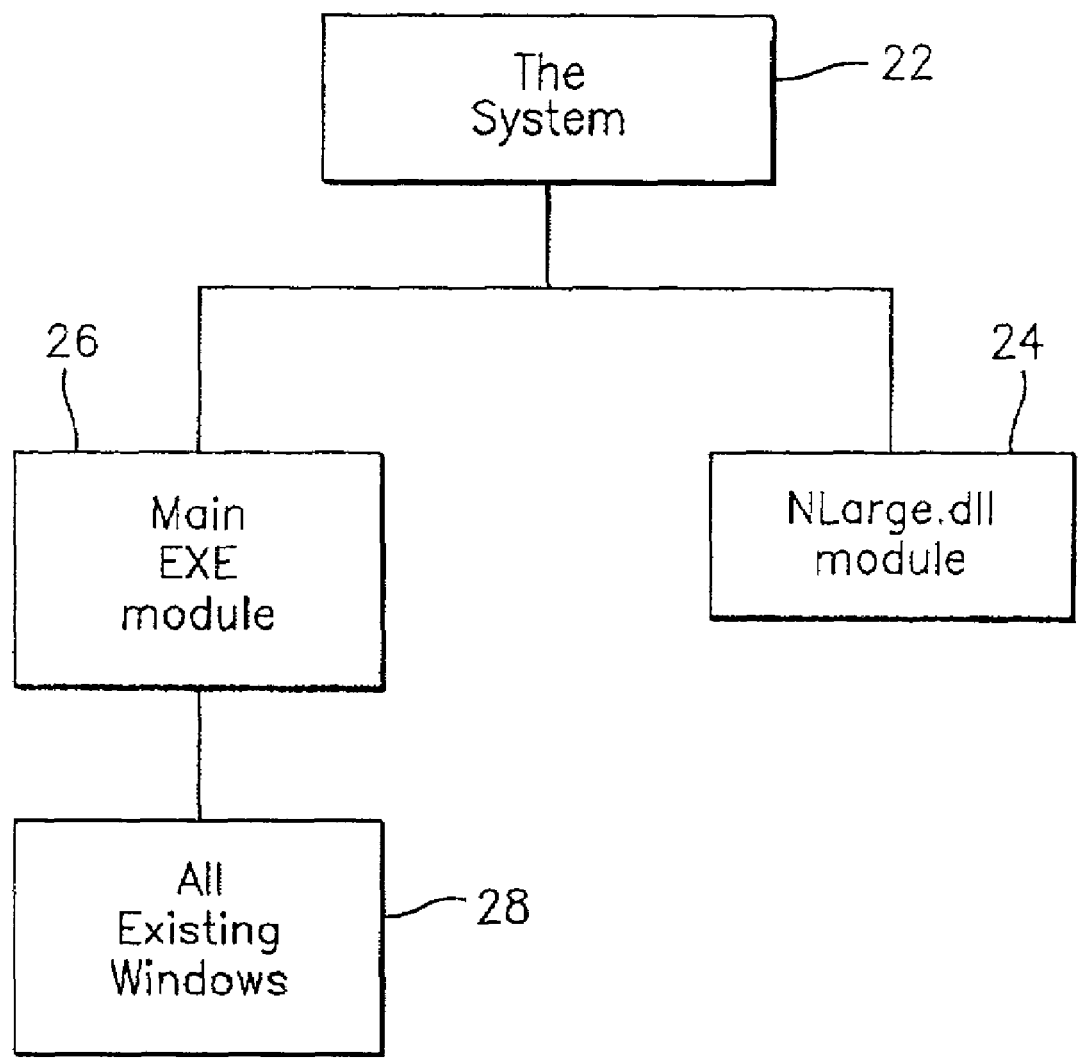
FIG. 2 is a flow chart which illustrates a general procedural flow of the present invention.
Figure 3:
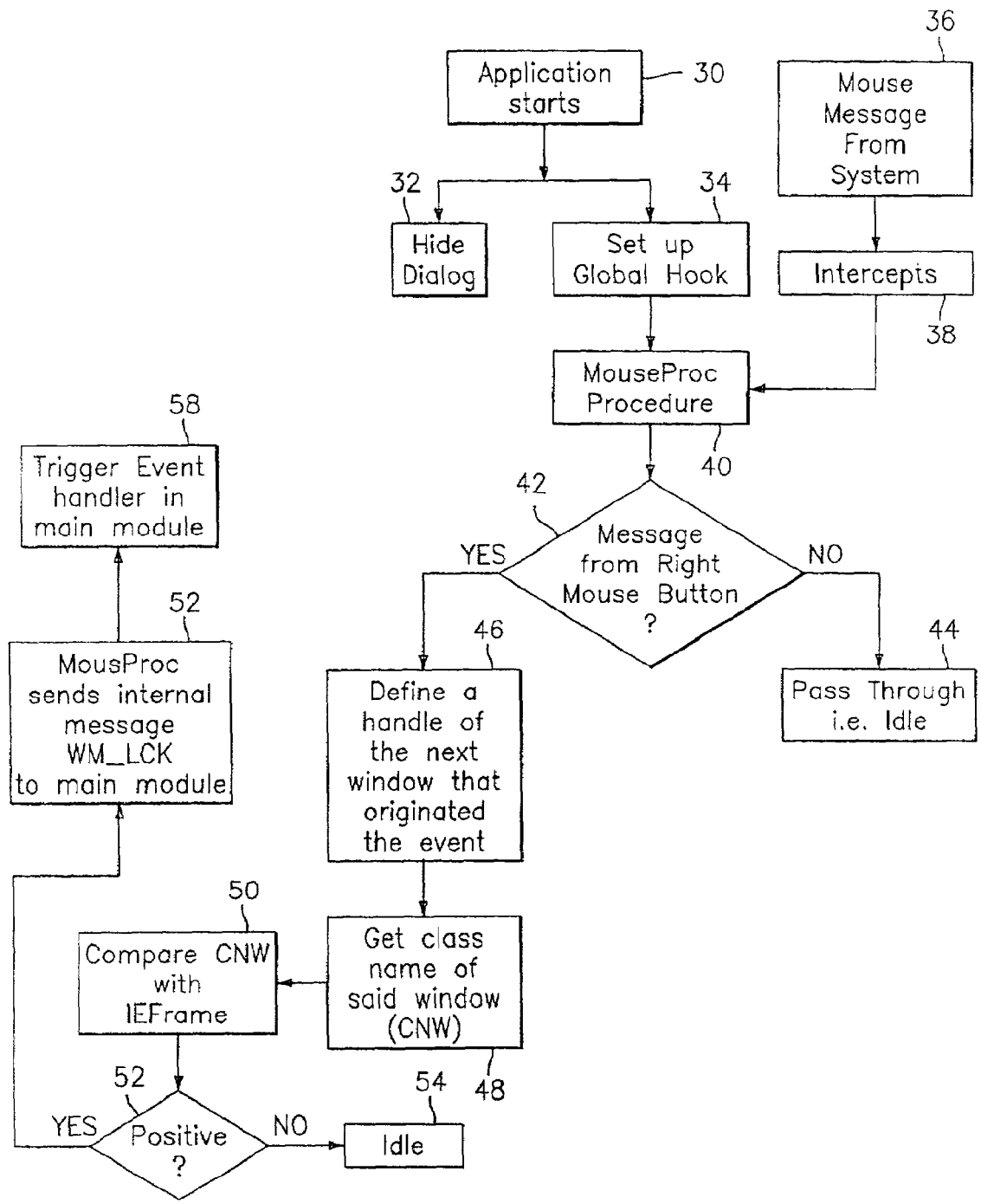
FIG. 3 is a flow chart which illustrates the procedural flow of the present invention.

Referring to the drawings FIG. 1, FIG. 2 and FIG. 3, in accordance with the present invention, a software program, herein referred to as NLarge application, is provided which facilitates the entry of a web address into the URL address window of a web browser. This software program consists of an executable module called MAIN.EXE 26 and a dynamic link library module called NLARGE.DLL 24. The modules may be in any suitable language for performing the functions to be carried out. To activate the NLarge application the user initiates the MAIN.EXE module. This creates and hides from view of the user, a text window and sets up a global hook procedure that is resident within the NLARGE.DLL module. It should be noted that when this text window is active, it remains on top of all open windows 28. This global hook procedure monitors and intercepts all user commands communicated to the computer from the mouse. The hook procedure redirects the mouse commands to a filtering procedure entitled MouseProc which is also resident within the NLARGE.DLL module. The MouseProc procedure filters the mouse commands associated with a user depression of the right mouse button.

Once the MouseProc procedure determines that a right mouse button depression event has occurred, MouseProc identifies and defines the window which originated the event to determine if the event is an actual web browser event. MouseProc does this by identifying the class name of the applicable browser window and comparing the class name with 'IEFrame'. 'IEFrame' is a class name which identifies all Microsoft Internet Explorer frame windows. If the comparison is positive and MouseProc determines that the event did occur within a web browser window, MouseProc informs MAIN.EXE that a valid right mouse button depression event has occurred. MouseProc does this by sending an internal message to MAIN.EXE which triggers an event handler resident within MAIN.EXE to begin scanning the window queue for the URL address bar associated with the web browser event. Upon locating the URL address window, MAIN.EXE copies the contents of the URL address window into the system clipboard and pastes this content into the text window which was created upon activation of the NLarge application. The text window is then displayed to the user and the user can edit the URL address text string contained within the text window.

Once the user completes editing the URL address, the user can either press the 'enter' button or the 'go' button to complete the event. MAIN.EXE captures and contains these events and activates a message handler resident within the MAIN.EXE module that will begin to import the text contained within the text window into the URL address window. The text is imported into the URL address window by initiating a cycle of WM_CHAR messages which imports each character of the string located within the text window into the URL address window. Upon completion of the text string importation into the URL address window, MAIN.EXE completes the 'enter' button or 'go' button depression thus imitating the user's click on the button and directing the web browser to the desired Internet address. MAIN.EXE does this by sending two mouse messages (WM_LBUTTONDN and WM_LBUTTONUP)to the web browser. At this point, the text window previously displayed to the user is hidden from view.

Upon initial activation, the NLarge application places an icon on the system tray and could be activated by double clicking on the icon. When the icon is activated, the user may enter a web address within the displayed text window and press 'enter' or 'go'. This will automatically activate and execute Internet Explorer and communicate the user with the desired website.

In addition, the user may resize the text window as desired. This will automatically resize the text contained within the text window to make it larger or smaller in size.

It should be noted that once the NLarge application is activated, it is always active in Windows and can only be closed from the icon located within the system tray. Once the NLarge application is deactivated, all system resources and pointers are returned to normal.

Again, referring to the drawings FIG. 2 and FIG. 3 illustrate a method for entering and facilitating the entry of a URL address into the URL address window of a web browser using the NLarge application.

The following examples demonstrate a typical user procedure. In accordance with the present invention, a user connects to the Internet using any conventional computer or Internet communicating device 22. The computer preferably has a Microsoft Windows operating system that employs a software and/or hardware controlled cursor, a keyboard, web browser software for communicating with the Internet and a mouse for positioning the cursor within the web browser window. In addition, the computer preferably has the NLarge application software program that, upon command, creates and displays a text window to a user, receives an input from a user such as an edited URL address or a new URL address and pastes the input into the URL address window of the provided web browser. The mouse preferably has a left mouse button and a right mouse button for communicating user commands to the computer.

In accordance with the present invention, the user is using Microsoft Internet explorer to browse the Internet. The user then activates the NLarge Application 30 via the MS Windows menu bar. Upon activation, NLarge creates and hides a text window 32 and sets up a global hook 34 to intercept mouse commands 38. The user then operates the mouse so as to position the cursor within the URL address window and depresses the right mouse button. Upon depression of the right mouse button, a right mouse button depression event signal is sent 36 to the system and received and intercepted by the global hook procedure MouseProc 40. MouseProc determines if the event signal is valid 42 and if the event signal is not valid MouseProc lets the event signal continue on 44. An event signal is considered valid if the cursor is positioned over or within the URL address window. If the event signal is valid MouseProc identifies the window that originated the event 46, determines the class name of the window 48 and compares the class name with the IEFrame 50 to determine if the window in question is the URL address window. If the comparison is negative 52, then the NLarge application becomes idle 54 and the event signal is allowed to continue on. If the comparison is positive 52, MouseProc sends message WM_LCK to MAIN.EXE 56 to trigger the event handler in MAIN.EXE 58 which instructs NLarge application to display the text window to the user. Then user can then edit the URL address using the keyboard and connect to the desired web sight. When the user has finished editing the URL address, the user depresses the left mouse button so as to insert the new URL address into the web browser causing the interactive means to begin communicating with the URL address.

A more general example is as follows. Referring to FIG. 1, with the NLarge application active in the background and the computer communicated with the Internet, the user positions the cursor over the URL address window of the web browser 2 and determines if the window needs to be enlarged 4. If the window does not need to be enlarged the user will proceed as normal 6. If the window needs to be enlarged the user depresses the right mouse button 8. NLarge displays an enlarged text window to the user 10. The user edits the text contained within the text window 12 and depresses the left mouse button or depresses 'enter' 14. The text window then becomes hidden 16 and the URL address entered into the text window by the user is inserted into the URL address window of the web browser 18. NLarge then initiates and engages the web browser to connect the user to the desired web address 20.

An advantage of the present invention is that when the enlarged window appears, it displays the current URL address to which the web browser, such as Internet Explorer, is connected. This allows the user to observe and correct or edit it.

In accordance with the present invention, NLarge application may be written in C++, Java, Visual Basic or any other software language suitable to achieve the desired end purpose.

In accordance with the present invention, the interactive means may communicate to the Internet using any Internet Service Provider suitable to the desired end purpose.

In accordance with the present invention, the cursor means may be a mouse, tracking ball, light pen or the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

We claim:

1. A method for entering an Internet Uniform Resource Locator (URL) address into a URL address window comprising the steps of:

providing an interactive means for connecting to the Internet via a web browser having a URL address window, said interactive means having an operating system which employs a cursor;

said providing step further comprising providing interactive means having a software program which creates and displays an edit window and a mouse for positioning said cursor and for communicating user commands to said interactive means, said mouse having a right mouse button and a left mouse button;

connecting to said Internet using said interactive means and said web browser;

positioning said cursor over said URL address window using said mouse;

depressing the right mouse button to display an enlarged edit window;

inputting a desired URL address into the enlarged edit window;

issuing a command so that the enlarged edit window becomes hidden and the desired URL address is inserted into the URL address window; and engaging said interactive means so as to cause said web browser to be communicated with the inserted URL address.

2. The method according to claim 1, further comprising validating commands from said mouse and displaying said edit window to a user upon determination of a valid mouse command.

3. The method according to claim 1, wherein said positioning step comprises operating said mouse so as to position said cursor within said URL address window.

4. The method according to claim 1, wherein said engaging step further comprises depressing said left mouse button so as to cause said interactive means to communicate with said entered URL address.

5. The method according to claim 1, wherein said providing step further comprises providing a means for entering a URL address into said URL address window.

6. The method according to claim 1, wherein said connecting step further comprises connecting to said Internet using an Internet Service Provider (ISP).

7. The method according to claim 2, wherein said validating step further comprises examining said mouse command to determine if said cursor is positioned over said URL address window.

* * * * *